United States Patent [19]

Okabayashi

[11] Patent Number: 5,500,830
[45] Date of Patent: Mar. 19, 1996

[54] MEMORY ACCESS DEVICE

[75] Inventor: Ichiro Okabayashi, Takatsuki, Japan

[73] Assignee: Matsushita Electric Industrial Co., Ltd., Osaka, Japan

[21] Appl. No.: 322,507

[22] Filed: Oct. 17, 1994

[30] Foreign Application Priority Data

Oct. 18, 1993 [JP] Japan .................................. 5-259835

[51] Int. Cl.⁶ .................................................. G06F 13/00
[52] U.S. Cl. ............................. 365/230.08; 365/230.01; 365/239; 395/427
[58] Field of Search ..................... 365/230.08, 230.01, 365/239; 395/425, 400

[56] References Cited

U.S. PATENT DOCUMENTS

| | | |
|---|---|---|
| 4,599,362 | 7/1986 | Kinjo et al. . |
| 4,763,294 | 8/1988 | Fong ........................................ 364/748 |
| 4,970,641 | 11/1990 | Hester et al. ............................. 364/200 |

*Primary Examiner*—Viet Q. Nguyen
*Attorney, Agent, or Firm*—Willian Brinks Hofer Gilson & Lione

[57] ABSTRACT

In a memory access device, each of read and write addresses generated by read and write address generating means is stored in a read or write address buffer through a read or write address latch. The memory is accessed based on an address supplied by either address buffer from the bottom side thereof. Each address generating means is arranged such that, when a generated address is stored in the corresponding address buffer, the address calculation stage is finished. Exception detecting means is arranged to conduct exception detection on each address before the address is supplied from the corresponding address buffer, i.e., while the address is being latched by the corresponding address latch. Accordingly, the exception detection on each address can be conducted independently from a pipeline operation, thus shortening the execution time of each calculation stage. This prevents the calculation stage from forming a critical path.

6 Claims, 8 Drawing Sheets

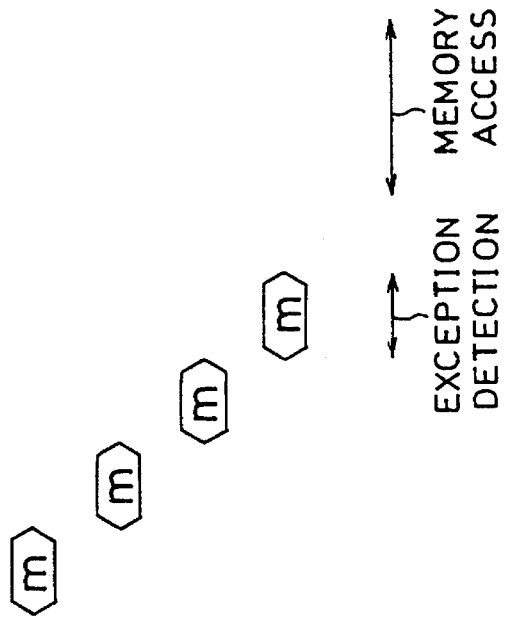
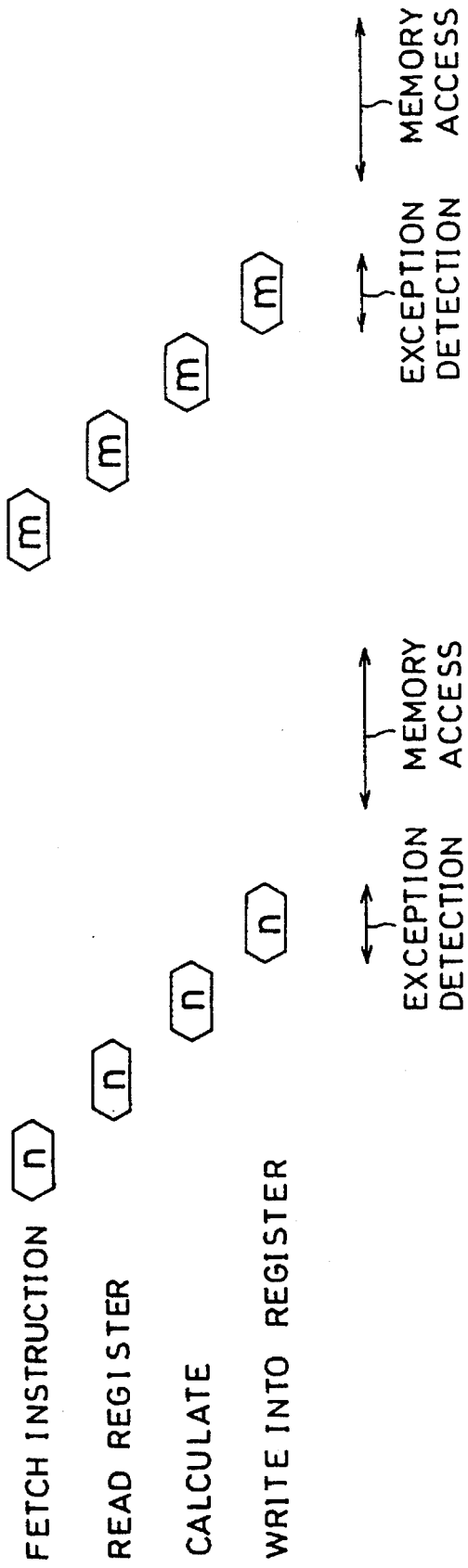

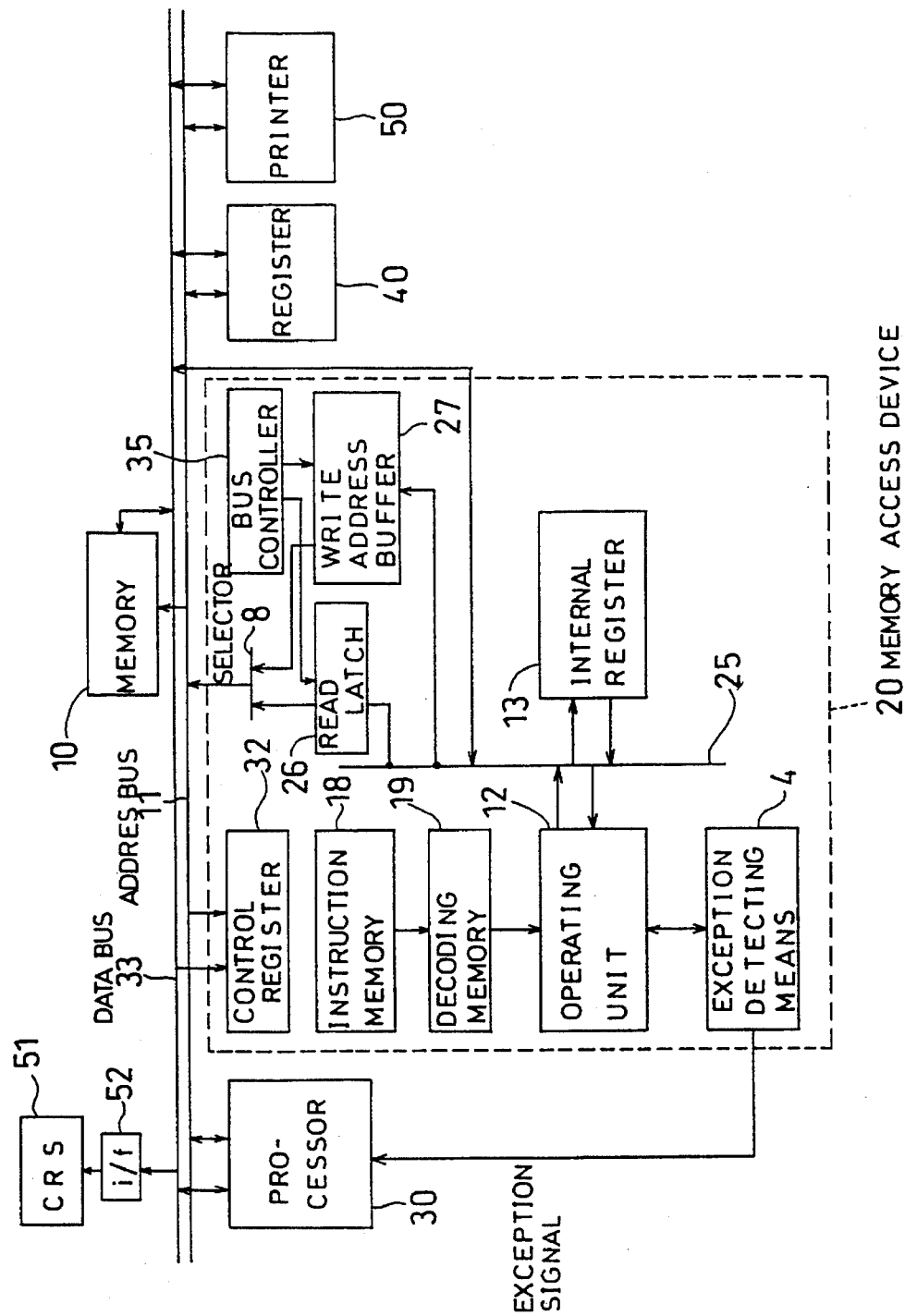

READ OPERATION

WRITE OPERATION

MEMORY ACCESS DEVICE

BACKGROUND OF THE INVENTION

1. Technical Field

The present invention relates to a memory access device such as a direct memory access controller (DMAC) or the like to be used as a peripheral device of a computer system.

2. Background Art

Nowadays, a computer system requires high-speed data transmission to and from a peripheral device, and is therefore often provided with a memory access device. In a parallel computer, too, data transfer among processors is an important issue. Consequently, a memory access device is also required in such a computer. When a general-purpose processor is used as such a memory access device, not only a complicate address calculation can be conducted, but also an address protection is achieved. Thus, a general-purpose processor is often used recently.

With reference to FIGS. 7 and 8, the following description will discuss the arrangement of a conventional memory access device in which a processor is used. FIG. 7 is a view illustrating the arrangement of a conventional memory access device and FIG. 8 is a timing chart of the memory access device in FIG. 7.

Shown in FIG. 7 are a memory 10 as an external device, a memory access device 20, a processor 30, a register 40 into which data are to be written from the memory access device 20, a printer 50 as a peripheral device, and a CRT device 51.

In the memory access device 20, a control register 32 is disposed for starting the memory access device 20 upon reception of an instruction from the processor 30.

Exception detecting means 4 is adapted to detect any of a variety of exceptions as to whether or not, at the time of a multi-user/multi-task operation, each address is nested in a predetermined range in order to protect the data in the memory of other users than the user himself or herself, whether or not an address for a breakpoint to be used for debug is identical with a predetermined value, and the like. Also shown in FIG. 7 are a read latch 26, a write address buffer 27, and a selector 8 for selecting either the write address buffer 27 or the read latch 26. An operating unit 12 and an internal register 13 are connected to each other by an internal bus 25. An instruction memory 18 is connected to a decoding memory 19. A bus controller 35 is adapted to control the data output timings of the read latch 26 and the write address buffer 27, and also to control the changeover of an output of the selector 8.

The memory 10, the memory access device 20, the register 40 and the peripheral device 50 are connected to one another by an address bus 11 and a data bus 33. The CRT device 51 is connected to the data bus 33 through an interface circuit 52.

The memory access device 20 having the arrangement above-mentioned will be operated in the following manner. Basically, the decoding unit 19 fetches and then decodes an instruction from the instruction memory 18, and then gives an instruction to the operating unit 12. The operating unit 12 makes a calculation through data communication to and from the internal register 13 via the internal bus 25. These operations are generally carried out in a four-stage pipeline of instruction fetch, register read, calculation and register write.

The following description will discuss how to access to the memory 10. For example, when the instruction decoded at the nth instruction fetch stage, has contents which indicate to read a data stored in the memory 10, the following operations are carried out. As shown in FIG. 8, the address is read from the internal register 13 at the register read stage and, with the use of the address thus read, the operating unit 12 calculates the address of the data to be read in the memory 10 at the calculation execution stage. Also, at the calculation execution stage, the address thus calculated is stored in the read latch 26 and the bus controller 35 controls the read latch 26 such that the address thus latched is supplied to the memory 10, and the data to be read in the memory 10 is then read. At the register write stage, the data thus read from the memory 10 is then stored in the internal register 13. The operations above-mentioned may correspond to a load instruction in terms of instruction codes. That is, "ld (r1) r2" refers to the operations of reading the contents of the address r1 of the memory 10 and storing the contents into the register r2 of the internal register 13.

On the other hand, when the instruction decoded at the mth instruction fetch stage has contents which indicate to store a data in the memory 10, the following operations are carried out. As shown in FIG. 8, the address is read from the internal register 13 at the register read stage, and the operating unit 12 calculates the address at which the data is to be written in the memory 10, at the calculation execution stage. At the register write stage, the address thus calculated is stored in the write address buffer 27. Then, the address thus stored and the data to be written, are supplied to the memory 10, and the data is actually written in the memory 10. As shown in the write operation in FIG. 8, such actual data writing is carried out after the register write stage and at the time when the bus controller 35 has detected vacancies of the address bus 11 and the data bus 33. The operations above-mentioned may correspond to a store instruction in terms of instruction codes. That is, "st (r1) r2" refers to the operations of storing the data r2 at the address r1 of the memory 10. The write address buffer 27 is a first-in first-out device for containing a plurality of sets each comprising an address and data to be written. While the memory 10 is not being used by other device, the bus controller 35 controls the write address buffer 27 such that the memory 10 is accessed based on each bottom address stored in the write address buffer 27. Until the write address buffer 27 is fully stored, a subsequent instruction can be executed.

A read or write operation for the memory 10 can be selected by the selector 8 which selects the read latch 26 or the write address buffer 27. However, a read operation has priority in general.

In both a read (ld) operation and a write (st) operation, exception detection by the exception detecting means 4 is carried out at the calculation execution stage, and an exception detecting operation is executed simultaneously with the generation of an address to be accessed. When an exception is detected, the exception detecting means 4 sends an exception signal to the processor 30. Through the interface circuit 52, the processor 30 causes the CRT device 51 to display the fact that the exception has been detected.

Such a conventional arrangement, however, presents the following problems. In each of reading a data from the memory and writing a data into the memory, a predetermined address is calculated and exception detection is subsequently carried out on the address thus calculated at the calculation stage as shown in FIG. 8. This lengthens the execution time of the calculation stage by a period of time required for such exception detection. Even though the period of time required for executing other stages of instruction fetch, register read and register write, is short, this period of time is determined, in a pipeline operation, as a period of time restrained by the execution time of the calculation stage. Thus, there is a likelihood that the calculation stage becomes a bottleneck (critical path). In particular, when desired to add an allowance for exception detection, the execution time of the calculation stage is further lengthened.

Further, in reading a data from the memory, there are carried out, at the calculation stage, read address calculation, exception detection and an operation of actually reading the data from the memory 10 with the use of the address thus calculated. Thus, the execution of the calculation stage takes much time. As the execution time of the calculation stage is lengthened, the effective performance is lowered.

APPLICATION OF THE DISCLOSURE

It is an object of the present invention to provide a memory access device in which exception detection on each address is conducted independently from a pipeline operation so that, with a sufficient allowance added for the exception detection, the execution time of each calculation stage is shortened, thereby to improve the effective performance.

To solve the problems above-mentioned, the present invention is arranged such that there are disposed address buffers for respectively storing calculated read and write addresses, that each calculation stage is finished when the address is stored in the corresponding buffer and that exception detection is conducted on the address stored in the buffer before a data read or write operation actually starts with respect to the memory based on the stored address.

More specifically, a memory access device according to the present invention comprises: address generating means for generating each of read and write addresses for access to an external device; a first address buffer in which stored is each of the write addresses generated by the address generating means; a second address buffer in which stored is each of the read addresses generated by the address generating means; and a selector for selecting either an output of the first address buffer or an output of the second address buffer; the external device being accessed based on an address supplied from the first or second address buffer selected by the selector; the address generating means being adapted to proceed to the next address generating operation upon completion of the operation of storing a current address in the first or second address buffer.

Another memory access device according to the present invention has address generating means for generating an address for access to an external device and an address buffer for storing each of the addresses generated by the address generating means, the external device being accessed based on an address supplied from the address buffer, and is characterized in that: the address generating means is adapted to proceed to the next address generating operation upon completion of the operation of storing a current address in the address buffer; and the memory access device further comprises exception detecting means for carrying out an exception detecting operation on each address supplied from the address generating means, the exception detecting operation being carried out before the address is supplied to the external device by the address buffer, the exception detecting means being adapted to inform the occurrence of an exception if generated in an address to be supplied by the address buffer.

A further memory access device according to the present invention comprises, in addition to the arrangement of the another memory access device above-mentioned, an address latch for latching an output of the address generating means, and is characterized in that: the exception detecting means carries out exception detection on each address while the address is being latched by the address latch; the address buffer has an address field for storing each address latched by the address latch and an exception field for storing each result of exception detection conducted by the exception detecting means; and the result of exception detection conducted by the exception detecting means is written in the exception field of the address buffer at the same time when the address is transferred from the address latch to the address field of the address buffer.

In the first-mentioned memory access device according to the present invention, each address calculation stage is finished at the time when a read or write address is generated and then stored in the corresponding address buffer, and then the execution of the next instruction is started. During the execution of this next instruction, the external device such as a memory or the like is accessed based on the bottom read or write address stored in the corresponding address buffer. Accordingly, the execution time of each address calculation stage is shortened as compared with the conventional arrangement where both read address calculation and read access execution are conducted at the read address calculation stage.

In the another memory access device according to the present invention above-mentioned, the exception detecting means carries out exception detection on each address generated by the address generating means, between the time when the address is stored in the corresponding address buffer and the time when the stored address is supplied from the address buffer such that access to the external device actually starts. Accordingly, the address generating means is arranged such that the calculation stage of each address generated by the address generating means can be finished at the time when the address is stored in the corresponding address buffer. Thus, as compared with the conventional arrangement where exception detection on each address is conducted at the address calculation stage, the amount of processing to be executed at the address calculation stage is reduced to shorten the execution time of each address calculation stage.

The further memory access device according to the present invention above-mentioned is arranged such that, when a new address is generated by the address generating means and then latched by the address latch, the exception detecting means carries out exception detection on the address as latched. At the same time when the address latched by the address latch is transferred to the address field of the address buffer, the result of exception detection conducted by the exception detecting means is stored in the exception field of the address buffer. Accordingly, when an address for which an exception has been detected, reaches the bottom of the address buffer, the exception detection is informed to the outside. Thus, the output timing of an address is identical with the output timing of the occurrence of an exception if generated in the address.

These and other features, objects and advantages of the present invention will be more fully apparent from the following detailed description set forth below when taken in conjunction with the accompanying drawings.

BRIEF DESCRIPTION OF THE DRAWINGS

FIG. 3 (a) is a basic timing chart of a read operation in the first embodiment, and FIG. 3 (b) is a basic timing chart of a write operation in the first embodiment;

FIG. 7 is a schematic view illustrating the arrangement of a conventional memory access device.

DETAILED DESCRIPTION OF THE INVENTION

The following description will discuss preferred embodiments of the present invention with reference to FIGS. 1 to 6.

(First Embodiment)

Figure 1:
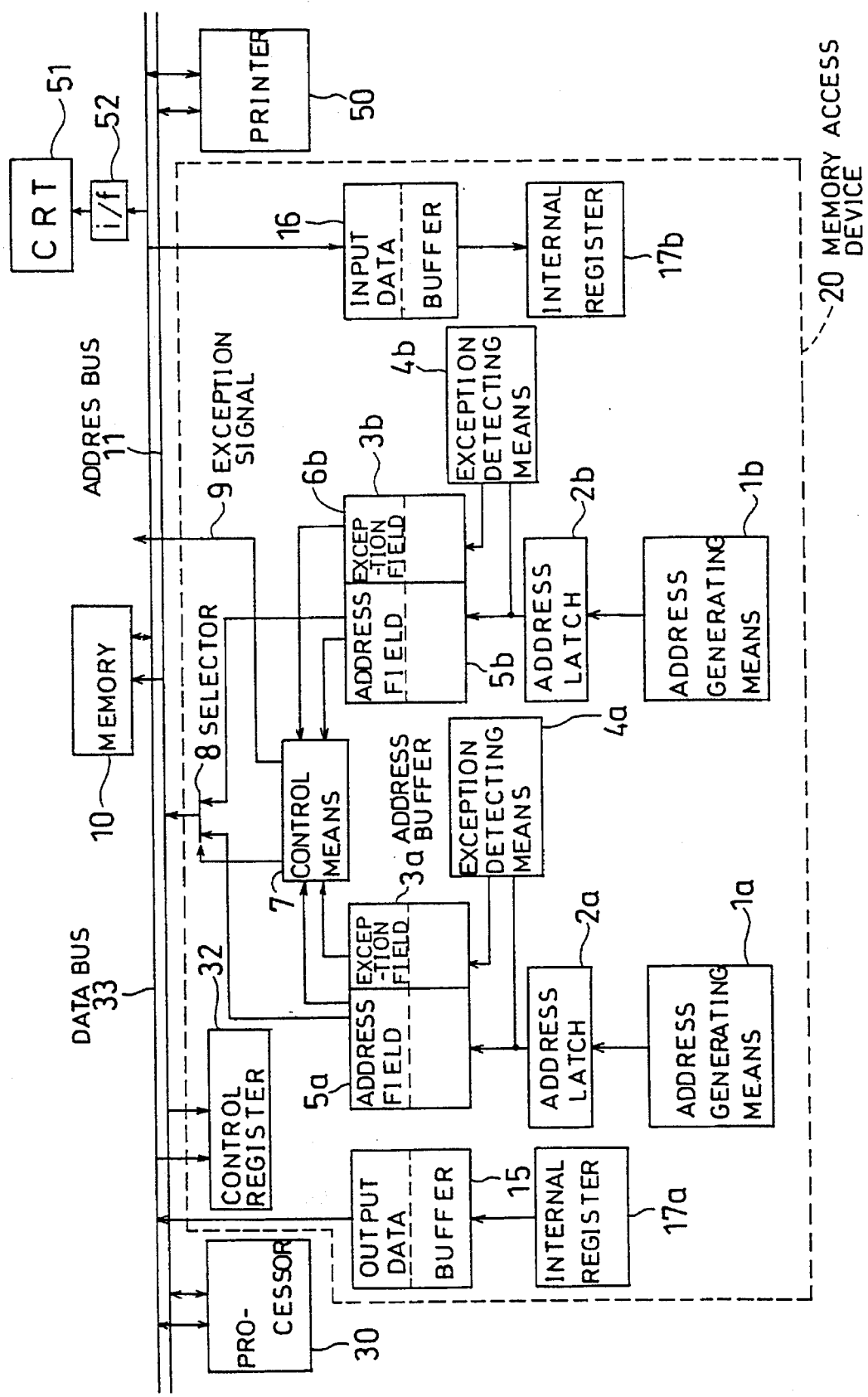
FIG. 1 is a schematic view illustrating the arrangement of a memory access device according to a first embodiment of the present invention.
Figure 2:
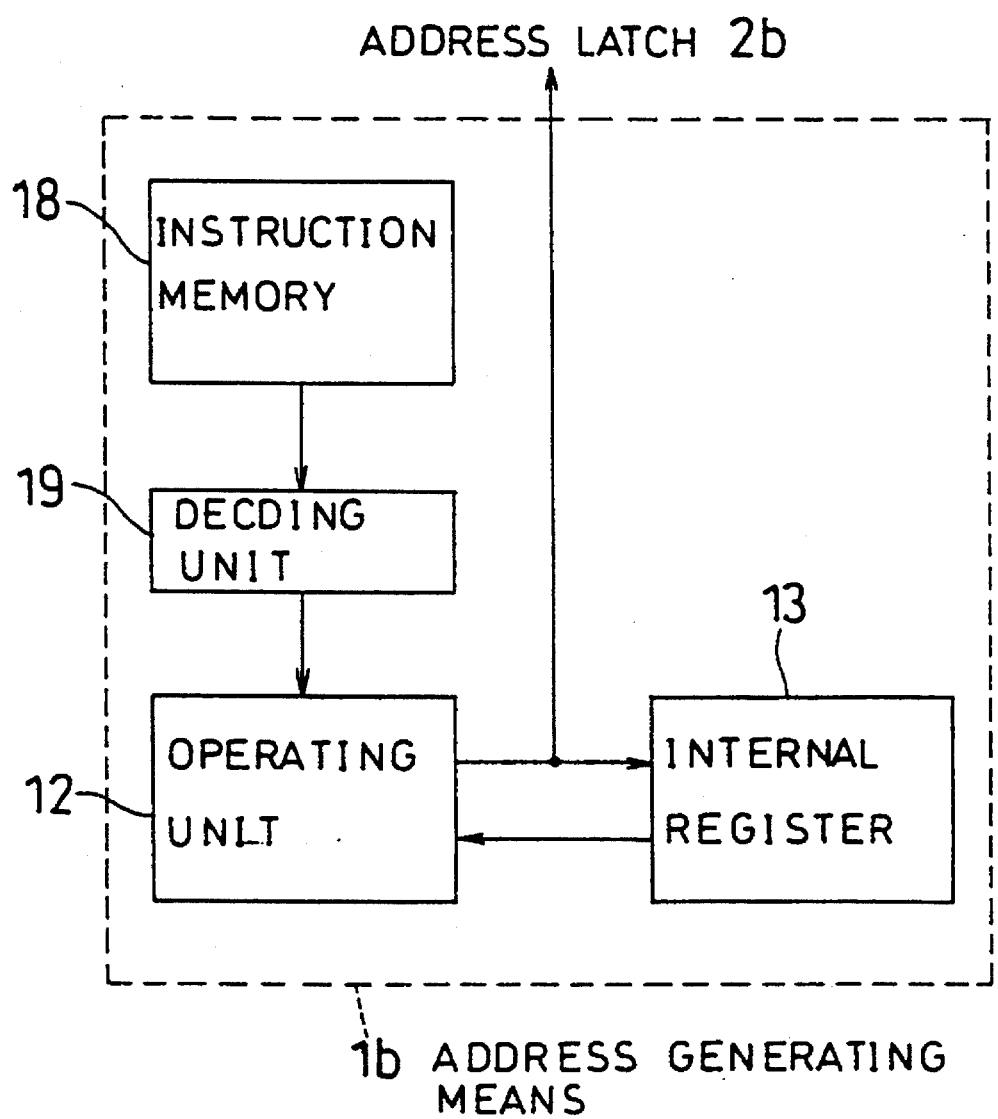
FIG. 2 is a schematic view illustrating the arrangement of address generating means in the first embodiment.
Figure 4:
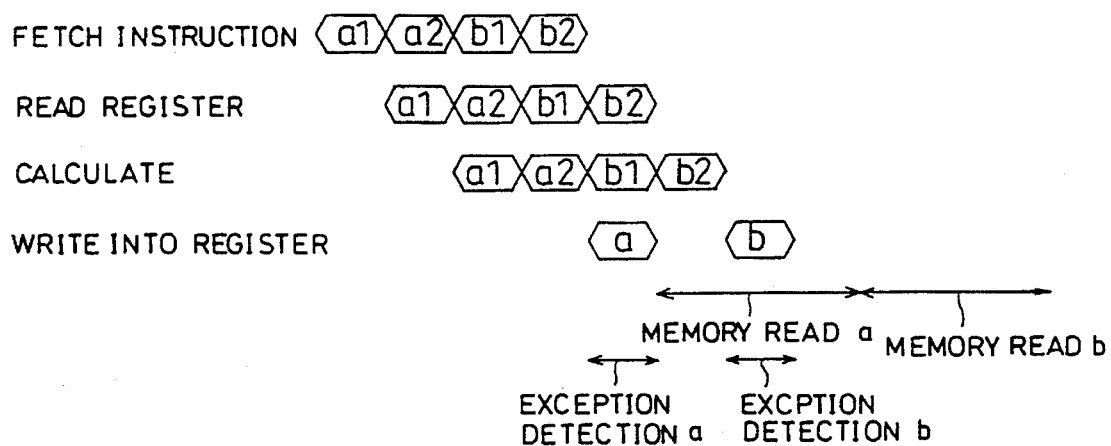
FIG. 4 is a timing chart where read accesses are continuously made in the first embodiment.

With reference to FIGS. 1 to 4, the following description will discuss a memory access device according to a first embodiment of the present invention. FIG. 1 is a schematic view illustrating the arrangement of the memory access device according to the first embodiment of the present invention. FIG. 2 is a schematic view illustrating the arrangement of the address generating means in the first embodiment. FIGS. 3 and 4 are timing charts in the first embodiment.

Shown in FIG. 1 are a memory 10 as an external device, a memory access device 20 according to the present invention, a processor 30, and a printer 50 as a peripheral device. These members are connected to one another by an address bus 11 and a data bus 33. A CRT device 51 is connected to the data bus 33 through an interface circuit 52.

In the memory access device 20, a control register 32 is disposed for starting the memory access device 20 upon reception of an instruction from the processor 30.

Disposed in the memory access device 20 are write address generating means 1a, read address generating means 1b, write address latch 2a, and read address latch 2b.

A write address buffer 3a has an address field 5a and an exception field 6a, and a read address buffer 3b has an address field 5b and an exception field 6b. A selector 8 is disposed for selecting either an output of the write address buffer 3a or an output of the read address buffer 3b. There are also disposed write exception detecting means 4a for conducting exception detection on each write address, and read exception detecting means 4b for conducting exception detection on each read address.

Control means 7 is arranged such that, if a write address or a read address is present in the address field 5a, 5b of the write or read address buffer 3a, 3b, the selector 8 is controlled at the time when the memory 10 is not being used, such that the address buffer 3a, 3b is so controlled as to supply the write or read address to the memory 10, and that an exception signal 9 is generated based on the exception detection result stored in the exception field 6a, 6b of the address buffer 3a, 3b. An output data buffer 15 is disposed for storing a data to be written in the memory 10. Disposed is an input data buffer 16 to which a data read from the memory 10 is to be entered through the data bus 33. An internal register 17a is disposed for supplying a data to the output data buffer 15, and an internal register 17b is disposed for storing a data entered into the input data buffer 16. The output and input data buffers 15, 16 are identical in capacity with the write and read address buffers 3a, 3b. When an address is supplied from the address buffer 3a or 3b, the data corresponding to the address thus supplied is supplied from the output data buffer 15 or entered into the input data buffer 16.

FIG. 2 shows the inside arrangement of the read address generating means 1b, which comprises an operating unit 12, an internal register 13, an instruction memory 18 and a decoding unit 19. The inside arrangement of the write address generating means 1a is not shown, but is the same as that of the read address generating means 1b.

The following description will discuss the basic operation of the memory access device 20 having the arrangement above-mentioned. It is noted that exception detection will be discussed later. In the following, the address flow is chiefly discussed.

A write or read address generated by the address generating means 1a, 1b passes through the address latch 2a, 2b, the address buffer 3a, 3b and the selector 8, and is finally sent to the memory 10 through the address bus 11. Each of the address buffers 3a, 3b is a first-in first-out device. A plurality of addresses stored in the address field 5a, 5b of the address buffer 3a, 3b are successively taken out starting with the bottom one, and used for access to the memory 10.

The control means 7 selects either an output of the write address buffer 3a or an output of the read address buffer 3b. Examples of a selection algorithm include a read-first algorithm, a write-first algorithm, a random algorithm and the like. Further, when a dynamic memory is used as the memory 10, there is also available an algorithm where priority is given to the address buffer of which outputs are continuously supplied.

In the read address generating means 1b, the decoding unit 19 fetches and then decodes an instruction from the instruction memory 18, and then gives an instruction to the operating unit 12 as shown in FIG. 2. After data communication to and from the internal register 13, the operating unit 12 calculates an address based on such data, thereby to generate a read address. The read address finally generated is stored in the read address latch 2b. The write address generating means 1a has the same arrangement as the read address generating means 1b.

The following description will discuss the operational timings at which a read address and a write address are generated. The operations are carried out in a manner of four-stage pipeline of instruction fetch, register read, calculation and register write. More specifically, a usual calculation is processed in order of the following four stages:

1. The decoding unit 19 fetches an instruction from the instruction memory 18;

2. According to an instruction of the decoding unit 19, the operating unit 12 reads the contents of a register of the internal register 13;

3. According to an instruction of the decoding unit 19, the operating unit 12 calculates a necessary address; and 4. According to an instruction of the decoding unit 19, the operating unit 12 writes the calculation result into a register.

For access to the memory, the operations are carried out in the following manner. FIG. 3 shows the timing chart of these operations.

1) When reading a data in the memory 10:

1. The decoding unit 19 fetches an instruction from the instruction memory 18;

2. According to an instruction of the decoding unit 19, the operating unit 12 reads the contents of a register of the internal register 13;

3. According to an instruction of the decoding unit 19, the operating unit 12 calculates, based on the address read by operating unit 12, the address of a data to be read in the memory 10; and 4. According to an instruction of the decoding unit 19, the operating unit 12 writes the address as the result of the calculation above-mentioned in the address latch 2b.

2) When writing a data in the memory 10:

1. The decoding unit 19 fetches an instruction from the instruction memory 18;

2. According to an instruction of the decoding unit 19, the operating unit 12 reads the contents of a register of the internal register 13;

3. According to an instruction of the decoding unit 19, the operating unit 12 calculates, based on the address read by the operating unit 12, the address of a data to be stored in the memory 10; and 4. According to an instruction of the decoding unit 19, the operating unit 12 writes the address as the result of the calculation above-mentioned in the address latch 2a.

In either a read operation or a write operation, the memory is actually accessed at the time when the bottom address is taken out from the address buffer 3a, 3b after the address has been transferred from the address latch 2a, 2b to the address buffer 3a, 3b.

These operations may be described, in terms of instruction codes, in the following manner:

1) For memory read:

Description: mv r1 rab

Here, "mv" refers to "move (data movement)", "r1" refers to the number of a register in the internal register 13, and "rab (Read Address Buffer)" refers to the read address buffer 3b. By moving the contents of the register r1 to the rab, read access is described.

2) For memory write:

Description: mv r1 wab

Here, "mv" refers to "move (data movement)", "r1" refers to the number of a register in the internal register 13, and "wab (Write Address Buffer)" refers to the write address buffer 3a. By moving the contents of the register r1 to the wab, write access is described.

FIG. 4 shows operations where read accesses are continuously made. In FIG. 4, it is supposed that two steps are required for generating a read address. By an instruction a1 and an instruction a2, a read address is calculated at the calculation stage, and the calculation result is written into the address latch 2b at the subsequent register write stage. Then, a memory read operation a is executed at the time when the memory 10 is not being used. When there are still present an instruction b1 and an instruction b2 after the instruction a2, a read address is calculated based on the instructions b1, b2 at the calculation stage. The calculation result is written into the address latch 2b at the subsequent register write stage. Then, a memory operation b is executed when the memory 10 is not being used.

At the calculation stage, the read address calculation based on the subsequent instructions b1, b2 starts when the read address calculation based on the instructions a1, a2 has been finished and the calculation result has been written in the address latch 2b. Accordingly, the execution time of the calculation stage can effectively be shortened as compared with the conventional arrangement where the memory read operation a is executed at the calculation stage. Further, while the memory read operation a is executed, the processing as to the subsequent instructions b1, b2 (the writing operation of the read address in the address latch 2b) can be executed with no wait. Accordingly, the memory read operations a, b can continuously be executed. Thus, even though address calculation is complicated, read access can continuously be achieved.

The following description will discuss the exception detection on each address with reference to FIG. 1.

The write or read exception detecting means 4a, 4b is adapted to receive an output from the write or read address latch 2a, 2b, and is connected to the exception field 6a, 6b of the write or read address buffer 3a, 3b. The write and read exception detecting means 4a, 4b are operated substantially in the same manner. Thus, the following description will discuss the operation of the read exception detecting means 4b.

The read exception detecting means 4b is adapted such that, when a new address is stored in the read address latch 2b, the read exception detecting means 4b conducts exception detection on this new address. At the point of time when the read address is transferred from the read address latch 2b to the address field 5b of the read address buffer 3b, the exception detecting means 4b stores the result of exception detection on this read address in the exception field 6b of the read address buffer 3b. When a read address for which an exception has been detected, reaches the bottom of the read address buffer 3b, the result of exception detection stored in the exception field 6b is supplied to the control means 7. The control means 7 supplies, to the outside, the detected exception as an exception signal 9.

As shown in FIG. 3, the exception detection is conducted at the same timing of the register write stage. It is enough that the exception detection on each read address is conducted before the read address is supplied from the read address buffer 3b, and in particular while the read address is being stored in the read address latch 2b. Accordingly, a period of time of one cycle in the pipeline can be used for such exception detection. Thus, the exception detection does not constitute a bottleneck.

Dependent on the type of a detected exception, the read exception detecting means 4b writes, in the exception field 6b of the read address buffer 3b, a different value, e.g., 00 for no exception detected, 01 for the address which deviates from a predetermined range, or 10 for the address identical with a predetermined value.

The control means 7 controls the operation according to the value in the exception field 6b. In the example above-mentioned, when the value is 00 indicating that no exception has been detected, the control means 7 controls such that a normal access operation is carried out. When the value is 01 or 10 indicating that an exception has been detected, the control means 7 controls such that a memory access operation is not carried out in any of both reading and writing modes, or only in the writing mode, and that an exception signal 9 is supplied to cause the CRT device 51 to display the fact that an exception has been detected.

As discussed in the foregoing, this embodiment is arranged such that, after a read address has been stored in the read address latch 2b, the next read address is calculated. Thus, even though the calculation is complicated, read accesses are continuously achieved while the execution time of each read address calculation stage is shortened. Further, it is enough that exception detection is carried out on a read address between the completion of the read address calculation stage and the output of the read address from the read address buffer 3b. Thus, while there is provided a sufficient allowance for exception detection on each read address, the execution time of each calculation stage is further shortened because the exception detection is carried out at other stage than the calculation stage. This improves the memory access device in effective performance.

In this embodiment, the two-system address generating means 1a, 1b are disposed inside of the memory access device. However, such means may be disposed outside of the memory access device. Further, such means may be disposed in a single system, or in three or more systems for reading, reading and writing or the like.

Further, the exception detecting means 4a, 4b are respectively disposed for read and write addresses, but it is enough if such means is disposed at least for write addresses. In this embodiment, the memory 10 is used as an external device, but it is a matter of course that the external device may be other disk or the like. When a plurality of external devices are present, there may be disposed a plurality of read address buffers and exception detecting means which are correspond to the plurality of external devices.

(Second Embodiment)

Figure 5:
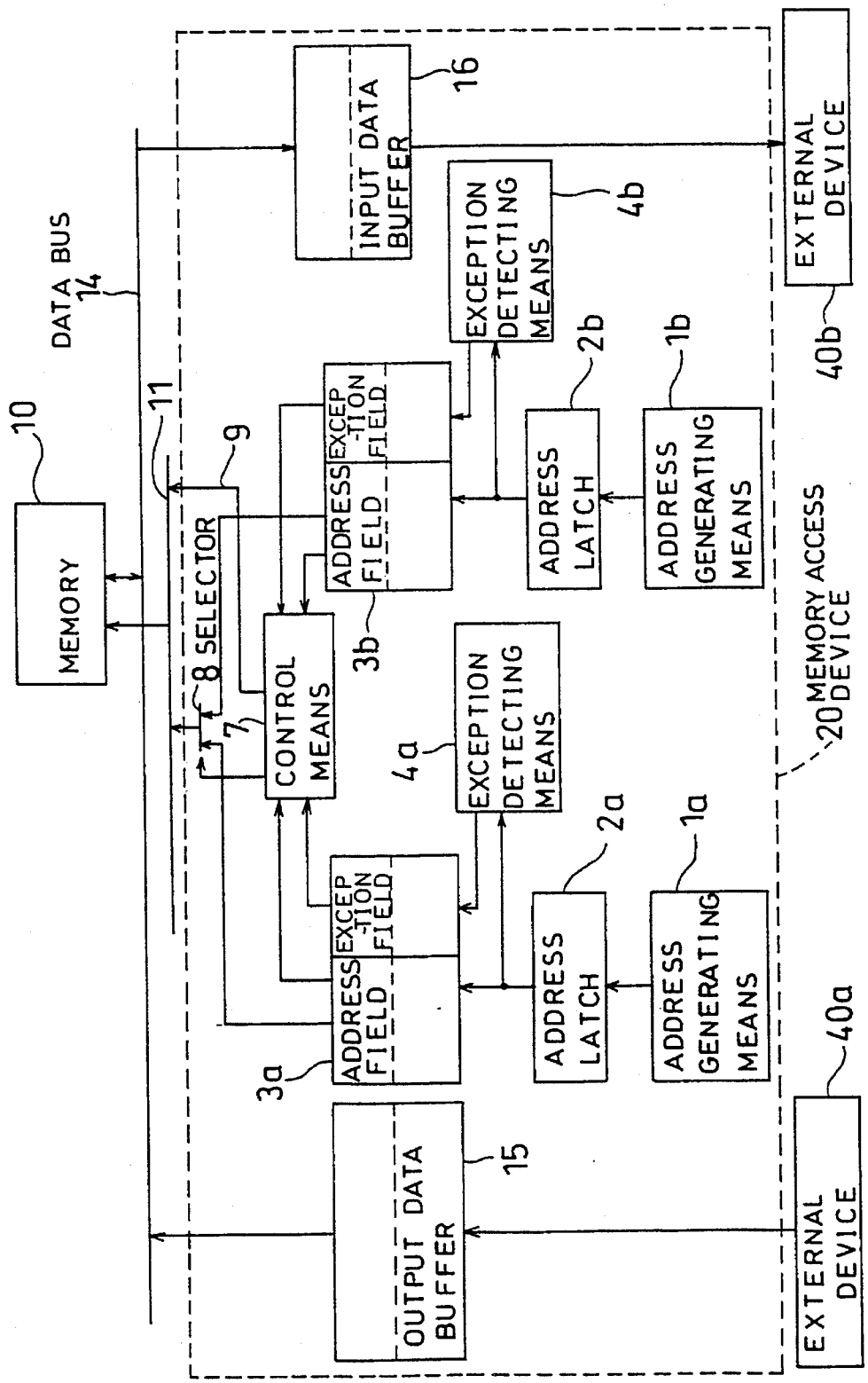
FIG. 5 is a schematic view illustrating the arrangement of a memory access device according to a second embodiment of the present invention.

FIG. 5 shows a memory access device according to a second embodiment of the present invention. In this second embodiment, external devices 40a, 40b are disposed outside of the memory access device although the registers 17a, 17b are disposed inside of the memory access device 20 in the first embodiment.

Accordingly, the second embodiment achieves data transmission to and from the external devices.

Figure 6A:
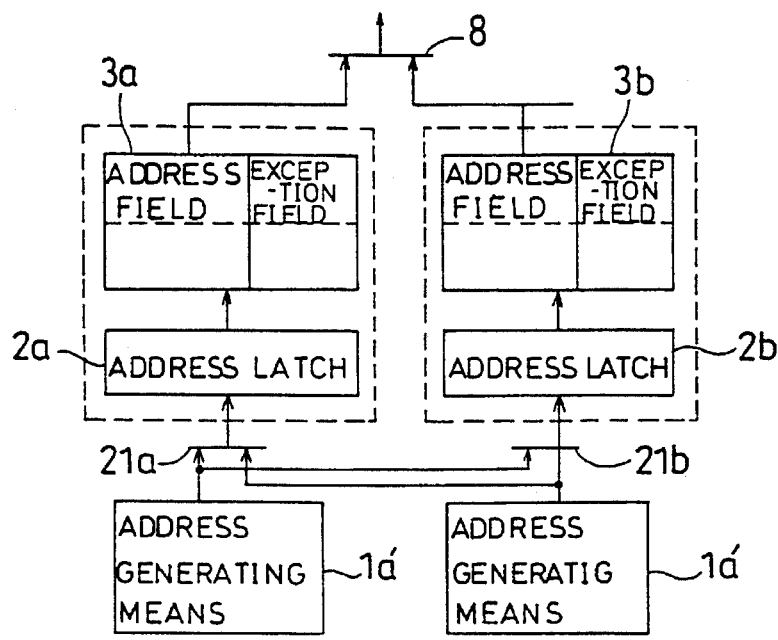
FIG. 6 (a) is a view of a modification of the memory access device according to the present invention, and FIG. 6 (b) is a view of another modification of the memory access device according to the present invention.
Figure 6B:
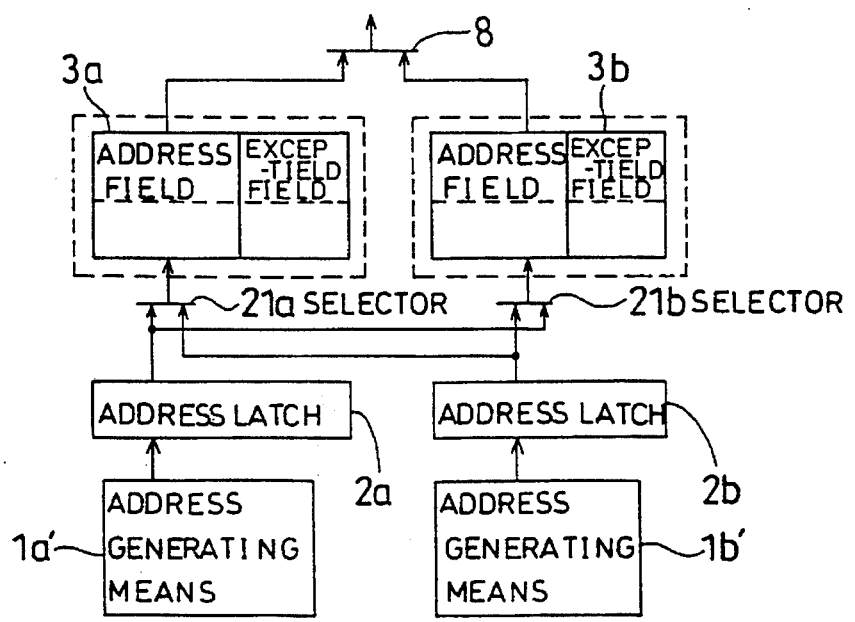
Figure 8:
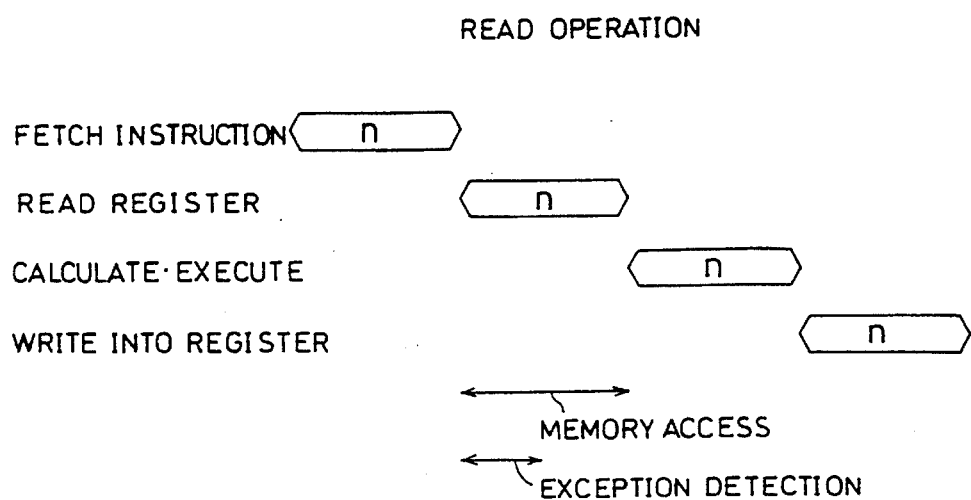
FIG. 8 (a) is the basic timing chart of a read operation in the conventional memory access device in FIG. 7, and FIG. 8 (b) is the basic timing chart of a write operation in the conventional memory access device in FIG. 7.
Figure 8:
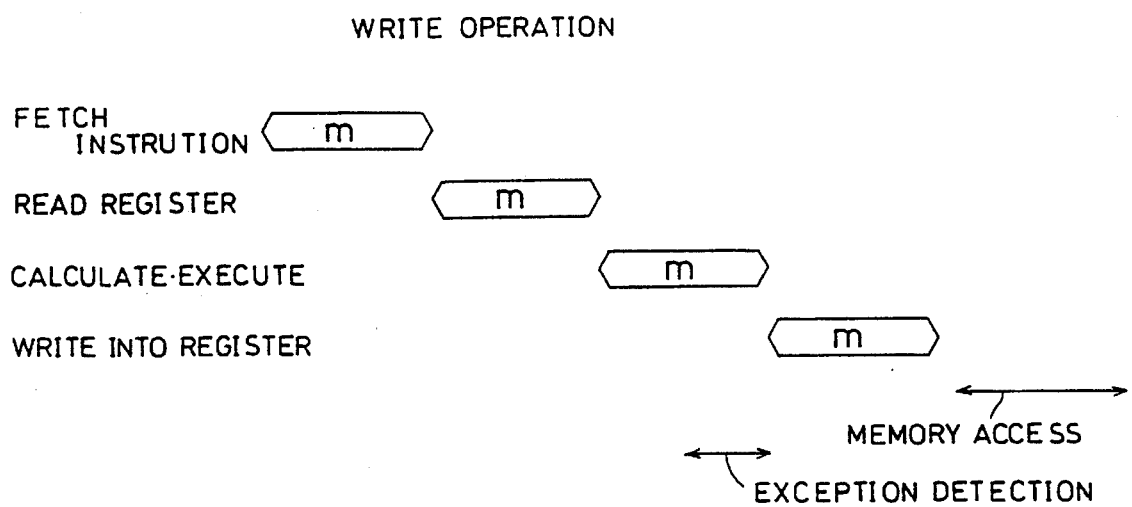

In the description in connection with the first and second embodiments, the address generating means 1a, 1b are respectively disposed as dedicated for write and read addresses. As shown in FIG. 6, however, the memory access device may be arranged such that a plurality of address generating means 1a', 1b' are disposed for generating both read and write addresses and that each of the read and write addresses thus generated is supplied to a corresponding read or write address buffer 3a, 3b. In such an arrangement, there are disposed selectors 21a, 21b for selectively connecting the address generating means 1a', 1b' to the read or write address buffer 3b. In FIG. 6 (a), the selectors 21a, 21b are disposed between the address generating means 1a', 1b' and the address latches 2a, 2b. In FIG. 6 (b), the selectors 21a, 21b are disposed between the address latches 2a, 2b and the address buffers 3a, 3b. In such an arrangement, the address generating means 1a', 1b' are equal to each other. Therefore, three or more address generating means may readily be disposed to facilitate the scale extension.

I claim:

1. A memory access device having an address generating means for generating an address for access to an external device, an address buffer for storing each of the addresses generated by said address generating means, and an address latch for latching each output of the address generating means, said external device being accessed based on an address supplied from said address buffer, said memory access device characterized in that:

said address generating means is adapted to proceed to the next address generating operation upon completion of the operation of storing a current address in said address buffer, and said memory access device further comprises an exception detecting means for carrying out an exception detecting operation on each address supplied from said address generating means while the address is being latched by said address latch, said exception detecting operation being carried out before the address is supplied to said external device by said address buffer, said exception detecting means being adapted to indicate the occurrence of an exception if generated in an address to be supplied by said address buffer, said address buffer has an address field for storing each address latched by said address latch, and an exception field for storing each result of exception detection conducted by said exception detecting means; and the result of exception detection conducted by said exception detecting means is written in said exception field of said address buffer at the same time when the address is transferred from said address latch to said address field of said address buffer.

2. A memory access device according to claim 1, wherein the exception detecting means comprises an exception detecting unit for each read address for access to the external device and an exception detecting unit for each write address for access to said external device.

3. A memory access device according to claim 1, wherein, when there is detected an exception in a write address to be supplied from the address buffer, the exception detecting means informs the occurrence of said exception such that a write operation is not carried out to the external device.

4. A memory access device according to claim 1, wherein the address buffer is operated according to a first-in first-out algorithm.

5. A memory access device according to claim 1, wherein:

the address generating means comprises a plurality of address generating units for generating both read and write addresses;

the address latch comprises two latch units for latching read and write addresses, respectively; and said memory access device further comprises a plurality of selectors arranged such that each of the read addresses generated by said plurality of address generating units is entered into said read address latch unit and that each of the write addresses generated by said plurality of address generating units is entered into said write address latch unit.

6. A memory access device according to claim 1, wherein:

the address generating means comprises a plurality of address generating units for generating both read and write addresses;

the address latch comprises a plurality of latch units for latching both read and write addresses;

the address buffer comprises a buffer unit for storing each read address and a buffer unit for storing each write address; and said memory access device further comprises a plurality of selectors arranged such that each of the read addresses supplied by said plurality of address latch units is entered into said read address buffer unit and that each of the write addresses supplied by said plurality of address latch units is entered into said write address buffer unit.

* * * * *